(12) United States Patent
Lee

(10) Patent No.: US 11,459,464 B2
(45) Date of Patent: Oct. 4, 2022

(54) MOLD COATING AGENT WITH ADJUSTED ACID VALUE HAVING FUNCTION AS CONCRETE RELEASING AGENT

(71) Applicant: WOORAM COATING CO., LTD., Gimpo-si (KR)

(72) Inventor: Seung Yeol Lee, Incheon (KR)

(73) Assignee: WOORAM COATING CO., LTD., Gimpo-si (KR)

( * ) Notice: Subject to any disclaimer, the term of this patent is extended or adjusted under 35 U.S.C. 154(b) by 434 days.

(21) Appl. No.: 16/491,463

(22) PCT Filed: Mar. 21, 2018

(86) PCT No.: PCT/KR2018/003297
§ 371 (c)(1),
(2) Date: Sep. 5, 2019

(87) PCT Pub. No.: WO2018/174560
PCT Pub. Date: Sep. 27, 2018

(65) Prior Publication Data
US 2020/0032074 A1    Jan. 30, 2020

(30) Foreign Application Priority Data

Mar. 22, 2017   (KR) ........................ 10-2017-0035956

(51) Int. Cl.
| | |
|---|---|
| *C09D 5/00* | (2006.01) |
| *C09D 125/14* | (2006.01) |
| *C09D 127/06* | (2006.01) |
| *C09D 133/06* | (2006.01) |
| *C09D 161/06* | (2006.01) |
| *C09D 179/04* | (2006.01) |
| *E04G 19/00* | (2006.01) |

(52) U.S. Cl.
CPC ............. *C09D 5/00* (2013.01); *C09D 125/14* (2013.01); *C09D 127/06* (2013.01); *C09D 133/066* (2013.01); *C09D 161/06* (2013.01); *C09D 179/04* (2013.01); *E04G 19/00* (2013.01)

(58) Field of Classification Search
CPC ...... C08L 2666/24; C08L 51/06; C08L 61/28; C08L 25/08; C08L 2666/04; C08L 51/00; C08L 55/005; C08L 51/003; C09D 5/00; C09D 125/14; C09D 127/06; C09D 133/066; C09D 161/06; C09D 179/04; C09D 161/28; C09D 125/06; C09D 133/06; C09D 133/12; C09D 161/00; E04G 19/00; B29C 33/56
See application file for complete search history.

(56) References Cited

U.S. PATENT DOCUMENTS

| | | | |
|---|---|---|---|
| 5,856,408 A * | 1/1999 | Matsukura | ............ C08L 55/005 525/301 |
| 2011/0021668 A1* | 1/2011 | Hamai | .................... C04B 28/02 524/5 |
| 2014/0234584 A1* | 8/2014 | Hyde | ................... C09D 153/02 428/152 |
| 2020/0032074 A1* | 1/2020 | Lee | ...................... C09D 133/06 |

FOREIGN PATENT DOCUMENTS

| | | |
|---|---|---|
| JP | H 06-136950 A | 5/1994 |
| JP | H 09-316240 A | 12/1997 |
| JP | 2005-188214 A | 7/2005 |
| KR | 10-1057423 B1 | 8/2011 |
| KR | 10-2014-0073089 A | 6/2014 |
| KR | 10-2014-0133801 A | 11/2014 |
| KR | 10-2018-0024663 A | 3/2018 |
| WO | WO 2011/083033 A1 | 7/2011 |

OTHER PUBLICATIONS

International Search Report dated Jul. 23, 2018, issued to International Application No. PCT/KR2018/003297.

* cited by examiner

*Primary Examiner* — Robert S Jones, Jr.
*Assistant Examiner* — Jiangtian Xu
(74) *Attorney, Agent, or Firm* — Stein IP, LLC

(57) ABSTRACT

The present invention relates to a form coating agent, which has an adjusted acid value and a function of releasing forms from concrete. The present invention uses a copolymer containing: A) melamine polymer resin; B) polystyrene resin; C) phenol-formalin resin; D) polymethylmethacrylate; E) polyacrylate-based resin; and F) polyvinyl chloride.

1 Claim, No Drawings

MOLD COATING AGENT WITH ADJUSTED ACID VALUE HAVING FUNCTION AS CONCRETE RELEASING AGENT

CROSS-REFERENCE TO RELATED APPLICATIONS

This application is a national stage of International Application No. PCT/KR2018/003297, filed Mar. 21, 2018, which claims the benefit of Korean Application No. 10-2017-0035956, filed Mar. 22, 2017, in the Korean Intellectual Property Office, the disclosures of which are incorporated herein by reference.

TECHNICAL FIELD

The present invention relates to a coating agent composition which is coated on the surface of metal or wood forms to be used to construct concrete and cement buildings and which functions to release and remove the forms from the buildings, and to a method for preparing the same.

BACKGROUND ART

Over 130 years since concrete buildings were built in Chicago in the 1980's, a large number of form release materials have been applied to the surface of forms, which comes into contact with concrete, in order to release the forms from cured concrete. As such form release agents, petroleum-based oil materials have generally been used. In a very small number of cases, aqueous release agents obtained by emulsifying oils, as well as paraffin oils or soybean oils, have also been used as form release agents. However, at present, in almost all countries and construction companies, so-called formwork release agents are being used, which are made by adding grease or rosin to recycled waste oil in order to prevent the oil from flowing or increase the adhesion of the oil. In order to achieve the purpose of using this formwork release agent, the formwork release agent should be applied to the concrete-contact surface of forms whenever concrete is placed.

The present invention is directed to a method of synthesizing a release coating agent which functions to release forms from concrete, like the current formwork release agents, and which enables forms to be used 5 to 20 times after coating once with the release coating agent, without having to apply the release coating agent before every concrete placement.

Preparation methods according to conventional arts comprise synthesizing and mixing polymer resins, and preparing products comprising a top coating agent and an undercoating agent. However, conventional arts do not specifically mention detailed chemical structures for chemical synthesis, molecular weights, physical properties, and the like.

Meanwhile, conventional arts related to a coating agent composition include Korean Patent Application Publication No. 10-2012-014805.

DISCLOSURE

Technical Problem

The present invention relates to a method of preparing a release coating agent through a technology improved over the above-mentioned conventional art and through specific synthetic reaction steps, in which the release coating agent has a concrete form release effect and a strong ability to adhere to the metal surface after application, is prepared by obtaining the molecular formula, molecular weight and physical properties of a desired material so as to enable concrete placement, curing and form release processes to be performed repeatedly after coating once with the release coating agent, and has an optimal composition.

The present invention is intended to prepare a coating agent composition having optimal performance by: performing reactions for synthesizing several tens kinds of polymers in order to obtain a material satisfying the physical/chemical properties of a desired material; selecting several kinds of polymer resins approaching the desired material; and adjusting the methods for synthesis of these polymer resins and the composition of resins participating in the synthesis, thereby synthesizing homopolymer resin, copolymer resin, and terpolymer resin, and synthesizing multi-component polymers with varying composition ratios of these resins.

First, according to the most fundamental physical theory, the release effect in the present invention can be anticipated due to a definite difference between hydrophilic surface energy and hydrophobic surface difference, which is a physical property required to have the release effect after concrete curing in forms. This can also be seen from the results of the above-mentioned prior art search. However, the present invention is based on this physical property present between hydrophilic concrete and a lipophilic organic polymer. In addition, the release performance is determined according to the frictional force present between two surfaces in contact with each other, the surface strength, the strength of bonding to hydrophilic material (concrete), and the strength of bonding to lipophilic material (organic polymer coating agent).

In a preliminary experiment conducted in the present invention, a super water-repellent coating agent (manufactured by 3M widely known to the public) was applied to the surface of metal forms and concrete was cured in the metal forms, and then a metal form release experiment was performed. As a result, it was concluded that the super water-repellent coating agent had no ability to release the metal forms from hydrophilic concrete.

Thus, the process of releasing forms from concrete is understood by the following mechanism.

Cured hydrophilic concrete has a property of being difficult to bond with a lipophilic organic polymer resin, and when the bonding strength between concrete molecules is calculated as 100, the bonding strength between concrete and the surface of the release coating agent applied to the surface of forms is lower than 100. Thus, the cured concrete does not adhere to the surface of the release coating agent and is released. That is, the release process proceeds smoothly.

Meanwhile, if the bonding strength between forms and the release coating agent is weaker than the bonding strength between concrete and the surface of the coating agent, the coating agent will adhere to the surface of concrete without exerting its release performance.

Thus, only a polymer resin, which enhances the bonding strength between forms and the coating release agent and makes the bonding strength between forms and the molecules of the coating release agent greater than the bonding strength between concrete molecules and the surface of the coating agent, has good release performance, and the repeated release performance thereof is determined according to the weather resistance of the coating agent.

However, as described above, a polymer resin having strong intermolecular bonding strength has significantly low adhesion to a hydrophilic metal surface, and thus is very difficult to apply to the surface of metal forms.

Therefore, the present invention is intended to synthesize a polymer resin which can function as a costing agent which can function as a costing agent due to its stronger bonding strength than concrete molecules and its strong adhesion to the metal surface, and to prepare a form release coating agent composition using the polymer resin.

Technical Solution

A method for synthesizing and preparing a form coating agent according to the present invention for achieving the above object comprises a total of three divided steps for solving the problem. In the first step, 6 kinds of selected homopolymer resins are used as coating agents having continuous release function. Specifically, about 57 polymer resins were selected, and an experimental study was performed using these resins. As polymer resins selected for the purpose of the present invention, silicon-based resins were selected from among polymer resins which are mostly frequently used as release agents, but these resins showed no ability to release forms from concrete, due to their good affinity for concrete (i.e., good adhesion to concrete). The reason appears to be because of the intermolecular affinity between Si molecules abundantly present in silicon resins and Si molecules that make up most of concrete. In the case of straight-chain polymer resins, such as polyethylene, polypropylene and polyisobutylene, solvents that can dissolve these polymer resins to use them in coating do not exist. In the case of polycarbonate-based resins, solvents that dissolve these resins exist, but these resins need to be heated above 200° C. after coating and are difficult to use twice or more even after heating. Fluorinated polymer resins having water-repellent and oil-repellent properties are excellent in terms of form release from liquids and the like, but have a very weak ability to release forms from alkaline materials. That is, these resins exhibited no ability to release forms from a concrete paste having an alkaline pH of 12 or more. Rubber-based (butadiene) polymer resins have a very weak ability to release forms from concrete after curing, because concrete particles penetrate the polymer surface due to the weak surface strength of the polymer resin. In the case of epoxy-based polymer resins, oxygen molecules abundant relative to their molecular weight and amine molecules functioning as a curing agent show an affinity for concrete.

In the present invention, considering the above points, six polymer resin groups capable of functioning as release coating agents having the ability to release forms from concrete were selected. These resins were A) melamine polymer resin, B) polystyrene resin, C) phenol-formalin resin, D) polymethylmethacrylate, E) polyacrylate-based resin, and F) polyvinylchloride, and were selected as resins suitable for the purpose of the present invention. These selected resins enable forms to be released two or three times after coating once with these resins, and are suitable in terms of performance rather than the persistence of effects.

In the second step, in order to increase the weather resistance of the above six resins, an experiment was performed by using the chemical structures of the six polymer resins (A to F) as main chain structures and introducing nine chemical compounds, which have physical properties different from those of the resins A to F, and four compounds for melamine copolymers, as side chain structures. As a result, a total of 45 copolymer resins (based on resins B to F) and 4 melamine copolymer resins (based on resin A) could be obtained. Among these resins, side chain-introducing resins, which were used in the synthesis of the copolymers but not suitable for the purpose of the present invention, were excluded through a concrete curing experiment. As a result, the following four compounds necessary for the purpose of the present invention were selected as compounds for introducing side chains into the copolymers: a) ethylvinyl acetate, b) vinyl acetate, c) ethyl methacrylate, and d) 2-hydroxyethyl methacrylate. However, the melamine resin contained e) propanol and f) butanol as side chains. As a result of the experiment, desired materials could be obtained, which have increased weather resistance and thus enable forms to be used 5 to 8 times after coating.

The above-described copolymers increased the number of uses of forms (number of form releases). In the third step, in order to increase adhesion to a hydrophilic metal surface, terpolymers having an acid value adjusted to 1.5 to 20 by introducing polar groups were synthesized and used as a release coating agent. As a result, the adhesion of the release coating agent to the metal surface increased, and thus the number of uses of the release coating agent further increased. Thus, through an experiment that introduces 8 polar groups, including carboxylic acid, dicarboxylic acid, sulfonic acid and the like, the following compounds were selected as the polar groups to be introduced: a') maleic acid, b') maleic anhydride, c') methyl methacrylic acid, and d') acrylic acid.

The object of the present invention is achieved by a concrete form release agent comprising: either a polymer resin having a molecular weight of 30,000 to 100,000 and comprising one selected from among A) melamine polymer resin, B) polystyrene resin, C) phenol-formalin resin, D) polymethylmethacrylate, E) polyacrylate-based resin, and F) polyvinylchloride, or a copolymer resin having a molecular weight of 30,000 to 100,000 and comprising, based on the total weight of the polymer resin, 60 to 99.5 wt % of one or more of the above six polymer resins (A to F) as a main chain, and 0.5 to 40 wt % of one of a) ethylvinyl acetate, b) vinyl acetate, c) ethyl methacrylate, and d) 2-hydroxyethyl methacrylate, and e) propanol and f) butanol for the melamine polymer resin, as a side chain, wherein the concrete form release agent is used as a coating agent which is coated once on metal forms for concrete and releases the forms from cured concrete.

Preferably, as a polar group, each of a') maleic acid, b') maleic anhydride, c') methyl methacrylic acid and d') acrylic acid is introduced into the copolymer in an amount of 0.1 to 15 wt %, thereby producing terpolymers. From these terpolymers, polymer resins, each having a molecular weight of 30,000 to 100,000, are selected and used alone or as a mixture.

Advantageous Effects

First, about 20 to 30 companies in Korea are completing for oil-based form release agents, and about 60 companies, including other small companies, are producing oil-based form release agents. As shown in the Internet homepages of representative companies, such as Kangnam Jevisco Co., Ltd. and Emax, the amount of oil-based form release agent applied is 9 to 10 L/m$^3$. The wall and floor area of one apartment layer consisting of four compartments (households) (each having an area of 32 pyeong (1 pyeong=3.3 m$^2$)) is calculated as about 1600 m$^2$ (48,000 m$^2$ for 30 layers). In this case, about 50 drums of the waste oil-based release agent are consumed for construction of 30 layers, and 99% of the waste oil-based release agent is absorbed into the cement surface of the building, and becomes the main cause of various environmental pollutions, such as sick house syndrome or surrounding pollution, after completion of construction of the building. However, the use of the coating agent of the present invention has no risk of environmental pollution.

Second, when the waste oil-based release agent is used, concrete forms are covered in oil and become greasy during assembly or release of the forms, and thus each of the forms reaches a weight of several tens of kilograms. Thus, risks can occur when moving thousands of such forms. However, the present invention eliminates such risks. In particular, the present invention can prevent slipping and falling accidents on the oil-based release agent sprinkled on the floor during slab Concrete work (ceilings and floors).

Third, it takes one day to apply the oil-based release agent at the construction site, and for a 30-layer building, the oil-based release agent needs to be applied 30 times. However, when the coating agent of the present invention is used, the construction period is shortened because it is not necessary to apply the coating agent every time.

In cold regions such as Russia, if the construction period is from April to October, metal forms are stored in the construction site during the remaining period. During this storage period, oxidation of the metal forms is serious, and a large amount of an antioxidant or an anti-rust agent is applied to prevent this oxidation, but it does not have a great effect. However, when the coating agent of the present invention is used, the metal forms can be stored for a long period of time without having to apply an anti-rusting agent or the like.

Fifth, construction sites also aim to reduce the number of safety accidents by operating the unmanned field. Therefore, in case of the above-mentioned 30-layer building, a manpower of about 60 persons is required to apply the oil-based release agent. However, when the coating agent of the present invention is used, such manpower is not necessary. Accordingly, safety accidents are reduced.

Sixth, the fundamental construction processes in a reinforced concrete construction site sequentially comprise: assembly of forms; application of a release agent; insertion and assembly; concrete placement; and release of the forms. However, when the technology of the present invention is used, the second process of applying the release agent is omitted, and thus the number of the processes is reduced.

MODE FOR INVENTION

Hereinafter, detailed description will be made on the features of a concrete form coating/coating agent having an adjusted acid value according to a preferred embodiment of the present invention.

The above-described resins are so-called general-purpose polymer resins which are synthesized as a large number of polymer resins according to the average molecular weight and emerged in the market. However, in order to achieve the object of the present invention, the average molecular weight of the polymer resins is limited. For the purpose of the present invention, the limited average molecular weight of the polymer resins is preferably in the range of 20,000 to 200,000, more preferably 30,000 to 100,000, most preferably 40,000 to 90,000. If the average molecular weight of these resins is lower than the lower limit of the above range, the softening point thereof will decrease, and thus concrete molecules will penetrate the resin surface, thus reducing the form release ability of the resins. If the average molecular weight of these resins is higher than the upper limit of the above range, the softening point will increase, and thus the so-called surface crack phenomenon in that the coated surface is finely cracked will occur. In this case, cement molecules will penetrate into the cracks, and thus the resins cannot exert form release performance. Therefore, an object of the present invention is to prepare a form coating/release polymer resin suitable for the purpose of the present invention, which is any one of the above-mentioned six homopolymer resins, in which the form coating/release polymer resin is synthesized to have a limited molecular weight of 30,000 to 100,000 and is used as a release coating agent which is applied to the form surface. Meanwhile, even when two or three of the above-described six resins are mixed, the mixture shows no significant difference in its performance.

Methods of synthesizing the six polymer resins (A to F) to have a limited molecular weight of 30,000 to 100,000 may be performed by various methods, and even polymer resins synthesized by different methods are within the scope of the polymer resins suitable for the purpose of the present invention.

Meanwhile, when the polymer resin having the above-mentioned limited molecular weight is applied to the concrete-contact surface of forms, it has an excellent effect of releasing the forms after concrete curing, but the number of releases of the forms is very limited. The coated surface of forms used for concrete curing after coating with the release coating agent is heavily contaminated by the concrete, and the coating agent applied to the surface is peeled off, indicating that the forms are difficult to use two or three times.

This will now be described by example of polystyrene. The experimental results revealed that the bonding between the molecules of polystyrene applied to the surface is strong, but the surface of polystyrene reused (two or three times) is readily aged, and particularly, the adhesion between polystyrene and the surface of metal forms is weak. For this reason, according to the present invention, the molecular structure of a copolymer was designed, which has one of the above-described six polymer resins as a main chain structure and also has a side chain, which has good surface weather resistance and can increase the adhesion of the main chain to the metal surface, thereby synthesizing a copolymer having suitable comonomer contents. The following four compounds which are polymerized into the side chains of the copolymers were finally selected through sufficient preliminary experiments: a) ethyl vinyl acetate, b) vinyl acetate, c) ethyl methacrylate, and d) 2-hydroxyethyl methacrylate. However, the melamine resin contained e) propanol or f) butanol as a side chain. Thus, a total of 22 copolymers (see Table 1 below regarding the contents) were each applied to the surface of forms, and then a form release experiment after concrete curing was performed. As a result, the results shown in Table 1 below were obtained. The weight content proportion (molecular weight proportion) of the main chain in each of the 22 copolymers A to F is preferably 60 to 99.5 wt %. The content proportion % described in the specification of the present invention means molecular weight % unless otherwise specified.

Meanwhile, the weight content proportion (molecular weight proportion) of the side chain corresponding to each of a) to d) is preferably 0.5 wt % to 40 wt %. In particular, the weight content proportion of d) 2-hydroxyethyl methacrylate is most preferably 1 to 5 wt %. If it is more than 5 wt %, it will increase the weather resistance, but will increase hydrophilic groups, resulting in a significant decrease in the form release ability.

In addition, the polymer resin obtained by synthesis according to the present invention preferably has a solid content ranging from 10 to 45%, and the remainder other than the solid content is a solvent. If the solid content is higher than the upper limit of the above range, the viscosity will increase, making it very difficult to perform the reaction process.

Example 1 (Homopolymer Resin Coating Agent)

15 wt % (on a solid basis) of each of the six homopolymer resins shown in Table 1 below was mixed with 30 wt % of methyl ethyl ketone (MEK), 25 wt % of toluene and 30 wt % of cellosolve acetate, thereby preparing 10 kg of each coating agent.

At this time, the mixing is preferably performed at a stirring speed of 20 to 150 RPM and a temperature of 25° C. to 55° C. If the stirring speed (RPM) is excessively high, a problem may arise in that the polymer chain is broken, and if the temperature is excessively high, a problem may arise in that the polymer is further polymerized to produce a polymer having a higher molecular weight.

Example 2 (Copolymer Resin Coating Agent)

15 wt % (on a solid basis) of each of the 22 copolymer resins shown in Table 1 below was mixed with 30 wt % of methyl ethyl ketone (MEK), 25 wt % of toluene and 30 wt % of cellosolve acetate, thereby preparing 10 kg of each coating agent. Here, the stirring speed and the temperature are as described above in Example 1.

An experiment on the form release ability of the coating agents prepared as described above was performed as follows.

Each of the prepared coating agents was applied on the surface of metal forms by means of a painting roller, and dried in an oven at about 25° C. for about 3 hours. Two sheets of the coated metal (60 cm×30 cm) were fixed to face each other at 5 cm intervals, thereby preparing a set of experimental metal forms. Concrete was poured into the 5 cm space between the experimental metal forms, thereby preparing experimental forms filled with about 5-cm-thick concrete. The concrete poured in the experimental forms was cured at about 23° C. for 48 hours, and then the fixing pins were removed from the experimental forms. Then, the forms were dropped vertically once or twice from a height of about 30 cm, and the extent to which the metal forms were released from the concrete by the dropping impact was defined as a measure of the form release ability. In addition, the extent of concrete contamination of the coated surface of the metal forms was observed visually, and the experiment on the form release ability was repeated until the contamination would reach a predetermined value (the experiment was ended when the area of the contaminated portion of the metal surface exceeded 5%).

Here, when the metal forms were not released even though the dropping was carried out up to four times, it was considered that the form release performance of the coating agent was not exhibited. This experiment was conducted by a research institute in a domestic university, and the results of the experiment are shown in Tables 1 and 2 below.

TABLE 1

|  | A) Melamine (2) | B) Polystyrene (3) | C) Phenol-formalin (2) | D) Polymethyl methacrylate (2) | E) polyacrylate (2) | F) Polyvinylchloride (2) |
|---|---|---|---|---|---|---|
| e) propanol | A-e (5) |  |  |  |  |  |
| f) butanol | A-f (6) |  |  |  |  |  |
| a) ethylvinyl acetate |  | B-a (6) | C-a (7) | D-a (6) | E-a (8) | F-a (7) |
| b) vinyl acetate |  | B-b (6) | C-b (6) | D-b (6) | E-b (6) | F-b (5) |
| c) ethyl methacrylate |  | B-c (7) | C-c(7) | D-c (7) | E-c (7) | F-c (8) |
| d) 2-hydroxyethyl methacrylate |  | B-d (8) | C-d (7) | D-d (7) | E-d (6) | F-d (8) |

The number of form releases is based on the degree to which the forms can be reused without any subsequent action after form release from concrete. (If the area of the contaminated portion of the surface of the metal forms was less than 5%, that is, up to a third-round test for the coating agent, the area of the contaminated portion of the metal surfaced was less than 5% of the total area, and in and after a fourth-round test, if the area of the contaminated portion of the metal surfaced was more than 5% of the total area, the number of form releases (form release performance) was determined to be 3.) In the case of the tested copolymer resins shown in Table 1 above, the weight content proportions of the main chains A to F were 92.5 wt % and 97 wt %, and the weight content proportions of the side chains were 7.5 wt % and 3 wt %.

Table 1 above shows the results of testing the form release ability of the coating agent comprising each of the homopolymer resins, and the results of testing the form release ability of the coating agent comprising each of the copolymers, each containing the homopolymer resin as the main chain and the introduced side chain. Here, the weight content proportions of the main chains in the copolymers were 92.5 wt % and 97 wt %, and the weight content proportions of the side chains were 7.5 wt % for a) ethylvinyl acetate and b) vinyl acetate, 3 wt % for c) ethyl methacrylate and d) 2-hydroxyethyl methacrylate, and 7.5 wt % for e) propanol and f) butanol. Under such conditions, a total of 22 copolymers were tested. The numbers in parentheses indicate the number of form releases (form release performance) after concrete curing in the forms to which the release coating agent was applied.

As can be seen from the results in Table 1 above, when the form release experiment was performed using the homopolymer resins (A to F) having an average molecular weight of 30,000 to 100,000, the number of form releases was only 2 to 3. However, when the copolymer resins were used, the number of form releases (the number of uses) was increased to 5 to 8, and this appears to be because the adhesion of the copolymer resins to the metal form surface was enhanced due to the effect of the side chains.

When the adhesion of the above-described copolymers needs to be further enhanced, a small amount of carboxylic acid, dicarboxylic acid or a dicarboxylic acid derivative can be introduced into the main chain structure of each of the copolymers, thereby increasing polar groups in the copolymers, thereby preparing terpolymers having an adjusted acid value of 1.5 to 2.0. These terpolymers may be used as metal form release/coating agents.

However, in some cases, the increased polar groups may result in a decrease in the concrete form release ability. As such polar groups that are introduced into the main chains, a') maleic acid, b') maleic anhydride, c') methyl methacrylic acid and d') acrylic acid are very useful.

At this time, the weight content proportions of the acids that are introduced to form the terpolymers may be in the range of 0.1 wt % to 15 wt %, thereby adjusting the acid value to 1.5 to 20. However, the polar group was not introduced into the copolymer comprising the melamine resin.

Since the melamine resin and the melamine copolymer have strong hydrophilicity in their molecular structure itself, an experiment that introduces hydrophilicity therein was not performed. Thus, the terpolymers having the carboxylic acid or carboxylic acid derivative introduced therein are a total of 80 terpolymers in consideration of four groups (a' to d') introduced into the five copolymers (B to F).

These terpolymers were applied once to the form surface, and a form release experiment was performed after concrete curing. As a result, these terpolymers enabled the forms to be used about 9 to 14 times. It is thought that this result was obtained because the coating agent comprising each terpolymer adhered to the concrete surface due to the increased adhesion of the coating agent to the metal form surface, and thus was not detached from the form surface.

The results of introducing these four polar groups indicated that there was no significant difference in adhesion force between the kinds of polar groups, but there was a difference in performance regarding the number of continuous uses of the polar group-introduced terpolymers (B to F). Table 2 below shows the molecular configurations of the 80 terpolymers and the number of form releases for each terpolymer.

Table 2 above shows the configuration of the terpolymers having the polar groups introduced therein. For example, [B-a-a'] depicts [polystyrene-ethylvinyl acetate-maleic acid]. The numbers in parentheses indicate the number of form releases (form release performance) after concrete curing in the forms to which the release coating agent was applied.

As shown in Table 2 above, the terpolymer release coating agents used in the form release ability experiment after concrete curing in the present invention were tested in five groups classified based on their main chain. Since the difference in the number of uses was not significantly changed by introduction of the four polar groups, the polar groups were introduced in very small amounts (0.6 wt %). These polar groups function to enhance the adhesion of the terpolymers to the hydrophilic metal surface, and did not greatly influence the form release ability on the concrete-contact surface. Here, the polar groups shown in Table 2 above were introduced in very small amounts (0.6 wt %), the terpolymer resins synthesized while substantially maintaining the contents of the main chains and side chains of the copolymers were used in the experiment.

The difference in the number of uses of the release coating agents prepared as described above is summarized below by the ascending order (the order in which the number of uses is smaller). However, each value regarding the number of uses is the average of three experiments conducted on each of the 80 terpolymers after concrete curing.

B) Four terpolymers containing polystyrene as a main chain (9 to 14);

C) Four terpolymers containing phenol-formalin as a main chain (9 to 11);

E) Four terpolymers containing polyacrylate as a main chain (9 to 11);

D) Four terpolymers containing polymethylmethacrylate as a main chain (9 to 11);

F) Four terpolymers containing polyvinyl chloride as a main chain (9 to 14).

In addition, the polymer resins synthesized to have an adjusted acid value of 1.5 to 20 by introducing only the above-described polar groups without introducing side chains into the homopolymers shown in Table 1 above showed a form release number of 4 to 7, indicating that these polymers have excellent performance.

TABLE 2

|  | A) Melamine | B) Polystyrene | C) Phenol-formalin | D) Polymethyl methacrylate | E) Polyacrylate | F) Polyvinyl chloride |
|---|---|---|---|---|---|---|
| a') maleic acid | A-e (5) (no polar group introduced) | B-a-a' (10) | C-a-a' (9) | D-a-a' (9) | E-a-a' (9) | F-a-a' (12) |
|  |  | B-a-b' (12) | C-a-b' (10) | D-a-b' (9) | E-a-b' (10) | F-a-b' (11) |
|  |  | B-a-c' (11) | C-a-c' (9) | D-a-c' (10) | E-a-c' (9) | F-a-c' (13) |
|  |  | B-a-d' (11) | C-a-d' (9) | D-a-d' (9) | E-a-d' (9) | F-a-d' (12) |
| b') maleic anhydride | A-f (6) (no polar group introduced) | B-b-a' (9) | C-b-a' (9) | D-b-a' (9) | E-b-a' (10) | F-b-a' (9) |
|  |  | B-b-b' (9) | C-b-b' (10) | D-b-b' (9) | E-b-b' (9) | F-b-b' (9) |
|  |  | B-b-c' (10) | C-b-c' (9) | D-b-c' (10) | E-b-c' (10) | F-b-c' (10) |
|  |  | B-b-d' (9) | C-b-d' (10) | D-b-d' (9) | E-b-d' (9) | F-b-d' (9) |
| c') methyl methacrylic acid | | B-c-a' (9) | C-c-a' (9) | D-c-a' (10) | E-c-a' (10) | F-c-a' (14) |
|  |  | B-c-b' (11) | C-c-b' (9) | D-c-b' (9) | E-c-b' (9) | F-c-b' (13) |
|  |  | B-c-c' (10) | C-c-c' (10) | D-c-c' (11) | E-c-c' (9) | F-c-c' (12) |
|  |  | B-c-d' (11) | C-c-d' (9) | D-c-d' (9) | E-c-d' (9) | F-c-d' (12) |
| d') acrylic acid | | B-d-a' (13) | C-d-a' (11) | D-d-a' (10) | E-d-a' (10) | F-d-a' (13) |
|  |  | B-d-b' (12) | C-d-b' (10) | D-d-b' (9) | E-d-b' (9) | F-d-b' (14) |
|  |  | B-d-c' (14) | C-d-c' (11) | D-d-c' (9) | E-d-c' (10) | F-d-c' (12) |
|  |  | B-d-d' (13) | C-d-d' (10) | D-d-d' (10) | E-d-d' (11) | F-d-d' (12) |

The above-described copolymerization and the reaction for introducing the polar groups can be performed using conventional polymerization inhibitors at a temperature of about 50 to 90° C. In some cases, in order to eliminate unreacted material, these reactions may also be performed at 120° C. for a short time. In addition, it is possible to prepare a coating agent comprising a mixture of two or more of these terpolymers, which have concrete form release ability similar to that of a single terpolymer.

The invention claimed is:

1. A form coating agent having a function of releasing forms from concrete, the form coating agent comprising:
   a polymer resin containing polymethylmethacrylate;
   a copolymer resin containing vinyl acetate as a side chain; and
   a terpolymer containing maleic anhydride as a polar group,
   wherein the polymer resin has a number average molecular weight ranging from 30,000 to 100,000 Daltons (g/mol).

* * * * *